(12) United States Patent
Schaefer et al.

(10) Patent No.: US 11,754,826 B2
(45) Date of Patent: Sep. 12, 2023

(54) TIRFM-CAPABLE MICROSCOPE AND METHOD FOR OPERATING A TIRFM-CAPABLE MICROSCOPE

(71) Applicant: Olympus Soft Imaging Solutions GmbH, Muenster (DE)

(72) Inventors: Michael Schaefer, Leipzig (DE); Klaus Christian Schuermann, Muenster (DE); Jennifer-Rose Krueger, Hiddenhausen (DE); Frank Wienhausen, Ochtrup (DE); Yuya Miyazono, Hachioji (JP); Daniel Krueger, Berlin (DE)

(73) Assignee: Evident Technology Center Europe GmbH, Muenster (DE)

( * ) Notice: Subject to any disclaimer, the term of this patent is extended or adjusted under 35 U.S.C. 154(b) by 0 days.

(21) Appl. No.: 17/210,738

(22) Filed: Mar. 24, 2021

(65) Prior Publication Data

US 2021/0302714 A1     Sep. 30, 2021

(30) Foreign Application Priority Data

Mar. 24, 2020   (DE) .................. 10 2020 108 117.0

(51) Int. Cl.
  *G02B 21/36*     (2006.01)
  *G02B 21/06*     (2006.01)
  *G02B 27/46*     (2006.01)
(52) U.S. Cl.
  CPC ........... *G02B 21/365* (2013.01); *G02B 21/06* (2013.01); *G02B 27/46* (2013.01)
(58) Field of Classification Search
  CPC .................... G02B 21/16; G02B 21/0076; G02B 21/0032; G02B 21/06; G02B 21/367;
(Continued)

(56) References Cited

U.S. PATENT DOCUMENTS

| 6,597,499 | B2 | 7/2003 | Kawano et al. |
| 2015/0009315 | A1 | 1/2015 | Fukutake |
| 2020/0064611 | A1* | 2/2020 | Shroff .................... G02B 21/16 |

FOREIGN PATENT DOCUMENTS

| CN | 107356566 A | 11/2017 |
| JP | 2012-003284 A | 1/2012 |
| JP | 2016-061967 A | 4/2016 |

OTHER PUBLICATIONS

Kogel, A., et al., "Artifact-free objective-type multicolor total internal reflection fluorescence microscopy with light-emitting diode light sources—Part I", Journal of Biophotonics, vol. 2, Issue 11, May 29, 2019, ppg. 1-11, ISSN: 1864-0648.

(Continued)

*Primary Examiner* — Farhan Mahmud
(74) *Attorney, Agent, or Firm* — Scully, Scott, Murphy & Presser, P.C.

(57) ABSTRACT

A TIRFM-capable microscope including: a light source that generates/emits incoherent excitation light onto an optical path that includes a first projection lens system, a spatial filter, a second projection lens system and an objective. The TIRFM-capable microscope also includes a controller; wherein the first projection lens system projects excitation light onto the spatial filter that filters the excitation light with two-dimensional patterns, the spatial filter lies in a plane conjugate to a back focal plane of the objective which includes an objective lens that directs excitation light onto and receives fluorescent light from the sample, wherein, for a numerical aperture $NA_{Obj}$ of the objective and a refractive index $n_{spec}$ of the sample $NA_{Obj} > n_{spec}$, and the controller activates the spatial filter to select/generate various two-dimensional patterns and selects/adjusts the position/shape/size of the pattern such that TIRF illumination of the sample is generated.

19 Claims, 5 Drawing Sheets

(58) Field of Classification Search
CPC .......................... G02B 21/002; G02B 21/006; G02B 21/0036; G02B 21/0048; G02B 21/365; G01N 21/6458; G01N 21/6428
See application file for complete search history.

(56) References Cited

OTHER PUBLICATIONS

Schaefer, M., et al., "Theoretical background of light-emitting diode total internal reflection fluorescence microscopy and photobleaching lifetime analysis of membrane-associated proteins—Part II", Journal of Photonics, vol. 13, Issue 4, Jan. 7, 2020, pp. 1-14, ISSN: 1864-0648.
Japanese Office Action dated Jul. 5, 2022 received in 2021-048672.
Chinese Search Report dated Nov. 1, 2022 received in 2021103053994.
Chinese Office Action dated Nov. 1, 2022 received in 2021103053994.

* cited by examiner

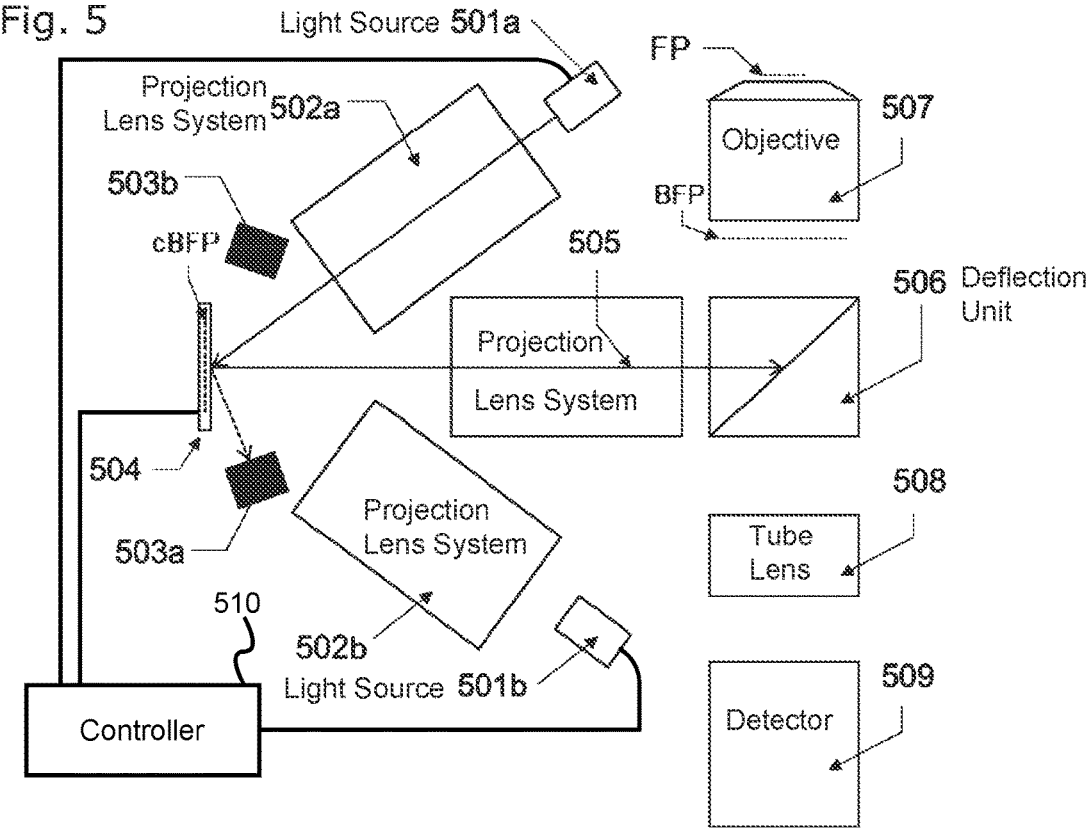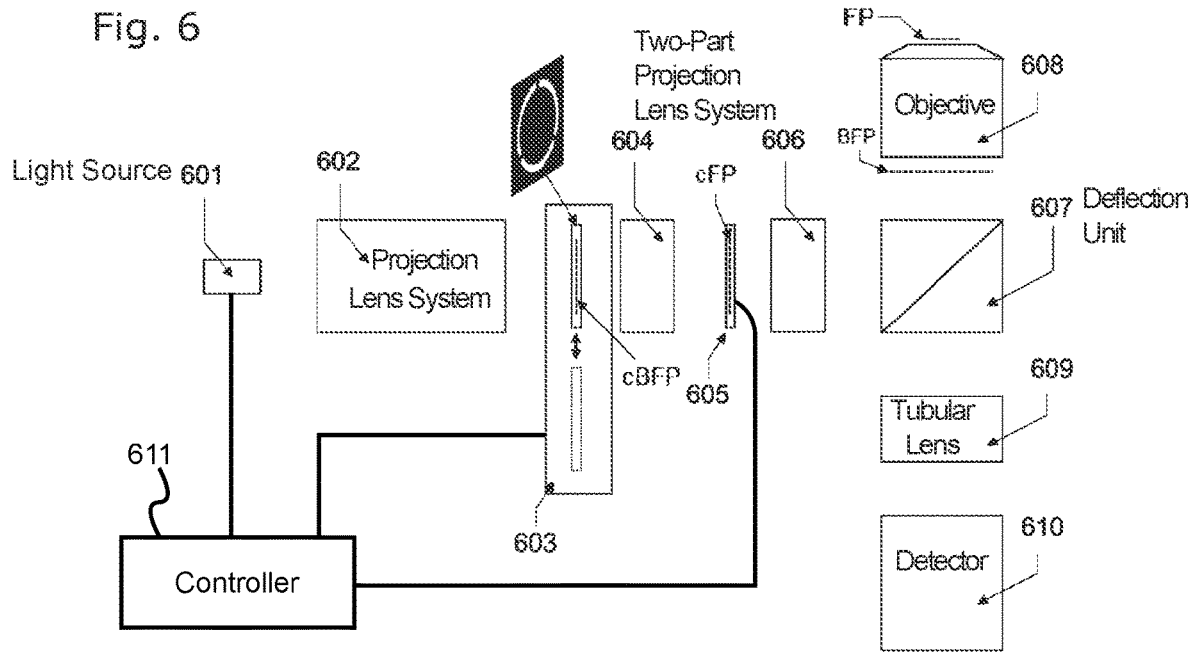

ation depth for visible light of 100-200 nm. If fluorescing
TIRFM-CAPABLE MICROSCOPE AND METHOD FOR OPERATING A TIRFM-CAPABLE MICROSCOPE

CROSS-REFERENCE TO RELATED APPLICATION

The present application is based upon and claims the benefit to DE 10 2020 108 117.0 filed on Mar. 24, 2020, the entire contents of which are incorporated herein by reference.

BACKGROUND

Field

The present disclosure relates to a TIRFM-capable microscope and a method for operating the same.

Prior Art

Total internal reflection fluorescence microscopy (TIRFM), i.e., microscopy with TIRF illumination, involves the excitation of a fluorescence of a specimen or a sample using an evanescent field. To generate the evanescent field, light is totally reflected on the inside of a reflective element, for example a cover glass, at the interface to the sample. This takes advantage of the fact that light in a medium with a higher refractive coefficient $n_1$ incident at a shallow angle on an interface with a medium with a lower refractive coefficient $n_2$ is totally reflected when this angle of incidence $\vartheta_1$, calculated from the normal to the interface, exceeds a critical angle $$\vartheta_c = \arcsin(n_2/n_1).$$

With this, a light field forms in the sample on the glass beyond the interface, which light field exponentially evanesces perpendicularly to the interface, with a typical penetration depth for visible light of 100-200 nm. If fluorescing molecules that can absorb light of the radiated wavelength are located in this region, they are excited to emit fluorescent light. Such fluorescent light is known as total internal reflection fluorescence (TIRF). TIRF leads to a very good limitation of the generated fluorescence to areas near the glass; the observed layer is only 100-200 nm thin. This achieves a significantly better resolution along the optical axis than in the case of normal fluorescence microscopy or confocal microscopy.

Most TIRFM-capable (=TIRF microscopy-capable) microscopes use one objective both for illumination and for collecting the fluorescent light. For this purpose, the objective must be suitable for illuminating the sample at angles that exceed the critical angle. Therefore, the numerical aperture NA of the objective has to be greater than the refractive index $n_2$ of the thinner medium, meaning $$NA = n_1 \sin \vartheta > n_2.$$

The position at which light passes through the back focal plane of the objective determines the angle at which the light passes through the focal plane of the objective, according to $$r = f^* NA = f^* n_1 \sin \vartheta,$$

wherein r describes the radial distance of the passage location of a light beam from the central beam path of the optical system in the back focal plane of the objective and f describes the focal distance or focal length of the objective. To generate an evanescent light field, the angle of the light in the focal plane must exceed the critical angle, and the distance of the light bundle from the center of the back focal plane must correspondingly exceed a critical radius $r_c$. TIRFM-capable microscopes are therefore often designed as inverse light microscopes with an objective in oil immersion and a very high numerical aperture (NA) of 1.45 or higher. This high numerical aperture allows for flat irradiation angles, wherein the excitation light is coupled in at the edge of the objective so that it contacts the interface to the sample at a flat, totally reflecting angle.

There are various possibilities for preventing the light from also hitting the interface at angles that are smaller than the critical angle, meaning at which light is not totally reflected. By using an incoherent light source, for example LEDs or a light bulb, an annular aperture that hides the central part of the light can be used in the beam path at a point that is conjugate to the back focal plane (BFP) of the objective. Such an arrangement is known, for example, from U.S. Pat. No. 6,597,499 B2. The use of such an aperture, however, results in a large portion of the light emitted by the light source not being used, which is amplified even more by the fact that the phase space (etendue) spanned by the microscope optics coincides very poorly with the etendue spanned by the light source, so that in some cases only approx. 1% of the emitted light is available for the excitation to begin with.

Another solution that circumvents this problem is using a laser light source in what are known as laser TIRFMs, which are coupled into the beam path of the microscope such that the light generated by the laser light source arrives almost completely at the interface to the sample. This solution, however, is more expensive and has the disadvantages optically that the light has only a very narrow spectrum, and diffraction effects and interference effects that can disrupt the image can occur as a result of the coherence of the laser light.

SUMMARY

On the basis of this prior art, it is an object to provide a TIRFM-capable microscope and a method for operating same that allow a high flexibility of the measurement.

Such object can be achieved by a TIRFM-capable microscope, comprising a first light source configured to generate and emit incoherent excitation light onto a first optical path, which in order comprises a first projection lens system, a first spatial filter device, a second projection lens system, and an objective, wherein the first projection lens system is configured to project the excitation light onto the first spatial filter device and the first spatial filter device is configured to spatially filter the excitation light with two-dimensional patterns, wherein the first spatial filter device lies in a first configuration in a plane (cBFP) conjugate to the back focal plane (BFP) of the objective, wherein the objective comprises an objective lens which is configured and arranged to direct the excitation light onto a sample and receive fluorescent light from the sample, wherein for a numerical aperture $NA_{Obj}$ of the objective and the refractive index $n_{spec}$ of the sample, $NA_{Obj} > n_{spec}$ applies, and wherein a first controller is configured to activate the first spatial filter device to select or generate various two-dimensional patterns and to select or adapt the position, shape, and or size of a two-dimensional pattern, such as an annular pattern, such that TIRF illumination of the sample is generated.

With the TIRFM-capable microscope, the variant in which the objective is used both for collection and for illumination is further developed. Instead of a fixed annular aperture, a variable spatial filter device can be used. TIRF illumination of the sample can be achieved with the incoherent light used by selecting or creating an annular two-dimensional pattern in which light in the optical beam path only remains within the annular aperture thus generated or selected, while light in the central part of the pattern and outside the ring is blocked. By adjusting the dimension of the annular pattern, it is possible to control, among other things, the penetration depth of the evanescent field into the sample.

A two-dimensional pattern that enables TIRF illumination does not necessarily have to be annular. It is sufficient for the central part to be excluded up to the critical radius. Outside of this central part beyond the critical radius, any pattern will lead to TIRF illumination. An annular pattern, however, ensures comparatively high luminosity and uniformity of the illumination.

In embodiments, the controller can be configured to activate the first spatial filter device to provide an annular pattern and a circular pattern as two-dimensional patterns in order to switch between TIRF illumination and non-TIRF illumination. With the circular pattern, in which excitation light is also transmitted within the critical radius, the TIRFM-capable microscope can also be operated as an epifluorescence microscope with so-called epi-illumination, which passes through the objective just like the TIRF illumination. However, the epi-excitation light does not experience total reflection; instead, it completely penetrates through the interface into the sample. The latter is thus illuminated in its entire thickness and excited to fluoresce. A greater light yield is thus achieved at the cost of the spatial resolution by selecting the layer near the interface.

The outer radius of the annular pattern can be smaller than or equal to a maximum of the extension of the back focal plane of the objective and the inner radius of the annular pattern can be greater than or equal to a critical radius of the back focal plane which corresponds to the critical angle for the total internal reflection in the focal plane of the objective. The limitation of the outer radius of the annular pattern ensures that the portion of the light that is allowed to pass through remains within the beam path of the microscope and thus no disruptions occur due to light scattering, while the limitation of the inner radius of the annular pattern ensures that the critical radius is not fallen below. With the adjustment of the inner radius, the penetration depth into the sample is also controlled.

In embodiments of the TIRFM-capable microscope, a second spatial filter device can be arranged in the first optical path in a plane (cFP) conjugate to the focal plane (FP) of the objective and can be configured to spatially filter the excitation light with a plurality of different two-dimensional patterns, and the first controller or a second controller can be configured to activate the second spatial filter device to select or generate a series of two-dimensional patterns. The second spatial filter device can be arranged in a plane (cFP) conjugate to the focal plane of the objective such that a two-dimensional pattern of the second spatial filter device leads to a corresponding spatial distribution of the illumination light at the location of the focus, i.e., in the sample or the specimen. Combining the first and the second filter device enables TIRF microscopy with structured illumination (total internal reflection fluorescence structured illumination microscopy, TIRF-SIM). In this case, the first spatial filter device can imprint an annular pattern on the excitation light in a plane conjugate to the back focal plane of the objective to generate TIRF illumination, while at the same time the second spatial filter device can imprint a sequence of structured patterns on the excitation light in a plane conjugate to the focal plane of the objective and in this way determines the location in the sample which is illuminated by the excitation light. A TIRF microscope with structured illumination (TIRF-SIM) can also be a TIRFM-capable microscope.

In embodiments of suitable variable spatial filter devices, the first spatial filter device can be configured as an aperture changing device with multiple circular and annular apertures, such as a rotatable aperture ring, or as a programmable spatial light modulator, such as a spatial transmission light modulator or as a spatial reflection light modulator, wherein the second spatial filter device can be configured as a programmable spatial transmission or reflection light modulator. A programmable spatial light modulator (SLM) can be, in one embodiment, an LCD matrix operated in transmission, the individual pixels of which can be switched back and forth between a light-permeable and a light-impermeable state (transmission SLM) and in an alternative embodiment a digital mirror device (DMD or reflection SLM) having an array or a matrix of pivotable micro mirror elements. Both the transmission SLM and the reflection SLM can be activated in a targeted manner such that they generate specific two-dimensional patterns, inter alia for example a ring with an adjustable inner radius and an adjustable outer radius. The fact that the spatial light modulators are freely programmable enables TIRFM-capable microscopes to be flexibly built and operated with a plurality of settings.

Embodiments of a TIRFM-capable microscope offer a possibility of switching between TIRF illumination and location-selective epi-illumination in that the first projection lens system completely or partially, the second projection lens system completely or partially, and/or the first spatial filter device can be arranged movably along the first optical path such that the first spatial filter device can be reversibly brought from the first configuration into a second configuration in which the first spatial filter device is arranged in a plane conjugate to the focal plane of the objective. With that, the TIRF filtration in the plane conjugate to the back focal plane of the objective is done away with, such that epi-illumination is automatically set, which is spatially filtered by the first spatial filter device in the second configuration.

In embodiments, if a third projection lens system is comprised which is configured and arranged to conjugate the first spatial filter device to the focal plane of the objective, wherein a switching optical unit is arranged between the first spatial filter device and the objective, which switching optical unit is configured to switch the optical path between the second projection lens system and the third projection lens system, an alternative or additional possibility for switching between TIRF illumination and location-selective epi-illumination is given.

The possibility of illumination with two different light sources, for example with different color spectra, can be provided in embodiments with a first spatial filter device configured as a digital mirror device (DMD) when a second incoherent light source is comprised which is configured to generate and emit incoherent excitation light, wherein the first light source and the second light source are each oriented towards the first spatial filter device, which is configured as a digital mirror device, wherein pivotable micro mirror elements of the digital mirror device, in a first pivot position, direct excitation light from the first light source and, in a second pivot position, direct excitation light from the second light source into the first optical path. In this way, by activating the DMD, the light source can be selected and the light sources can be switched between. In further developments, a beam absorber can be provided for each of the two light sources, which beam absorber receives and absorbs the portion of the light from a light source that is not conveyed into the optical beam path of the microscope.

In embodiments, the first light source and/or the second light source can comprise one LED or multiple LEDs, a combination of a light bulb and a light conductor, or a combination of a laser light source and a dynamic diffuser. A dynamic diffuser is a diffuser that is moved with high-frequency movements, for instance in the ultrasonic range, and thus disrupts the coherence of the laser light. Therefore, interference and diffraction effects that can otherwise occur to a considerable degree on the micro mirror elements of a DMD no longer occur.

Such object can also be achieved by a method for operating a previously described TIRFM-capable microscope in which a search pattern sequence of two-dimensional patterns on the first spatial filter device can be used to find the center of the back focal plane of the objective, each of which has a single small pixel cluster for conveying excitation light to the first optical path, which is moved within the search pattern sequence over search paths, such as straight search paths, wherein locations are noted at which the luminescence of the fluorescent light returning from the objective have maxima, and the center of a circle on which lie the multiple maxima of the luminescence that have been found is ascertained as the center of the back focal plane of the objective. The TIRFM-capable microscope and/or its controller(s) can be configured to execute such method. Such controller(s) can be a general purpose controller, a CPU, with the controlling functions implemented either as software running on a CPU or on various processing circuits or both.

With this method, it is possible to carry out centering, since the luminosity maxima all lie on a circle that corresponds to the critical angle for the total reflection. The centering of the annular aperture pattern on this center already ensures an effective centering of the excitation light with reference to the spatial arrangement of the optical system of the microscope.

Multiple search paths can run at different angles from the edge to the center of the first spatial filter device. If the centering of the optical system is close to an optimal centering, these radial search paths intersect the circle of the critical radius basically perpendicularly, so that the searched luminosity maxima are shown sharply in the luminosity curves. Glancing search path trajectories lead to a broadening of the maxima, resulting in less accurate centering.

In order to optimize centering in all cases, in embodiments of the method a sequence of search patterns with increasing fineness can be run and/or a control search pattern can be run after an initial rough determination of the center of the back focal plane of the objective, in which the circle found is scanned radially from different directions to ascertain the maxima of the luminosity with maximum sharpness and thus make a fine determination of the center.

In different embodiments, the TIRFM-capable microscope can be switched between TIRF illumination and non-TIRF illumination, operated in a TIRF-SIM mode, or operated in a switchable manner between multiple different light sources. It can also be arranged to combine these features and to operate one of multiple light sources in TIRF and another in epi-illumination by switching between the light sources accompanied by a shift of the first spatial filter device from the first configuration in the cBFP plane to the second configuration in the cFP plane. In this way, for example, an overview mode with broadband epi-illumination can be switchably combined with a detail mode with narrow-band TIRF illumination.

Further features will become apparent from the description of embodiments together with the claims and the attached drawings. Embodiments can fulfill individual features or a combination of several features.

BRIEF DESCRIPTION OF THE DRAWINGS

The embodiments are described below, without restricting the general idea of the invention, based on the exemplary embodiments in reference to the drawings, whereby reference is expressly made to the drawings with regard to all details that are not explained in greater detail in the text. In the figures:

FIG. 5 illustrates a schematic diagram of the optical components of a TIRFM-capable microscope in a third embodiment, FIG. 6 illustrates a schematic diagram of the optical components of a TIRFM-capable microscope in a fourth embodiment.

DETAILED DESCRIPTION

Figure 1:
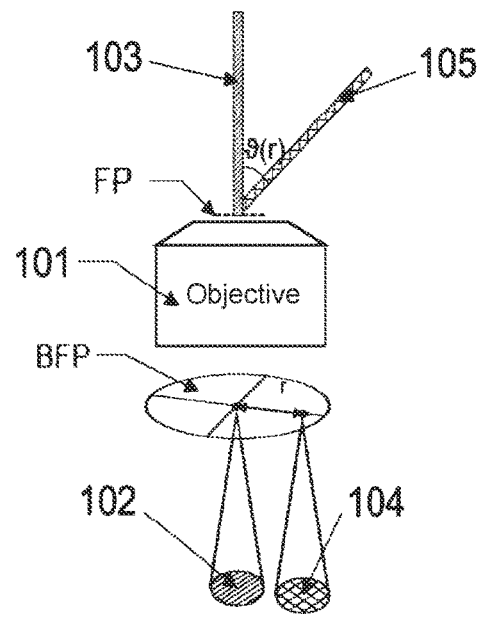
FIG. 1 illustrates a schematic principle diagram of the optical setup in the case of TIRF illumination.

In the drawings, the same or similar elements and/or parts are provided with the same reference numbers in each case, so that a renewed presentation is dispensed with in each case.

FIG. 1 illustrates an embodiment of a schematic principle diagram of an optical setup in the case of TIRF illumination. The objective 101 of the microscope, which can have one or more optical lenses and has a large numerical aperture to enable TIRF microscopy, is shown as a black box. The direction of propagation of the excitation light from a light source (not shown) runs from bottom to top. The objective 101 has a focal plane FP and a back focal plane BFP that are defined such that a parallel light beam bundle that hits the objective 101 from the back (the bottom in FIG. 1), is focused in the focal plane FP, while in the other direction a parallel light beam bundle that hits the objective 101 from the outside (the top in FIG. 1) is focused in the back focal plane BFP.

Two beam bundles 102, 104 are shown in FIG. 1 which, coming from the light source (not shown), pass through the back focal plane BFP at two different points. The beam bundle 102 runs through the center of the BFP, while the beam bundle 104 passes through at a peripheral point. Both beam bundles 102, 104 comprise beams that pass through the two points at different angles, i.e., they are not collimated. The optical properties of the objective 101 are such that the light beams of the central beam bundle 102 are collimated to form a beam bundle 103 that exits the objective 101 perpendicularly. The peripheral beam bundle 103 is also collimated, but exits at an angle $\vartheta(r)$ as a beam bundle 105 which depends on the distance or radius of the beam bundle from the center of the BFP. This dependency illustrates why, in the case of TIRF illumination in which a total reflection should take place, only those light beams that, in the BFP, have a distance from the center of the BFP that exceeds a critical radius are allowed to pass.

In real TIRFM optical units, this principle is subsequently modified so that the aperture for the TIRF illumination is not placed directly in the back focal plane BFP of the objective 101 but in a plane cBFP conjugate to the BFP. The placement of an annular aperture with suitable dimensions in a cBFP has the same effect as filtering directly in the BFP, since a cBFP is mapped into the BFP of the objective 101 by the subsequent optical elements in the beam path.

Figure 2:
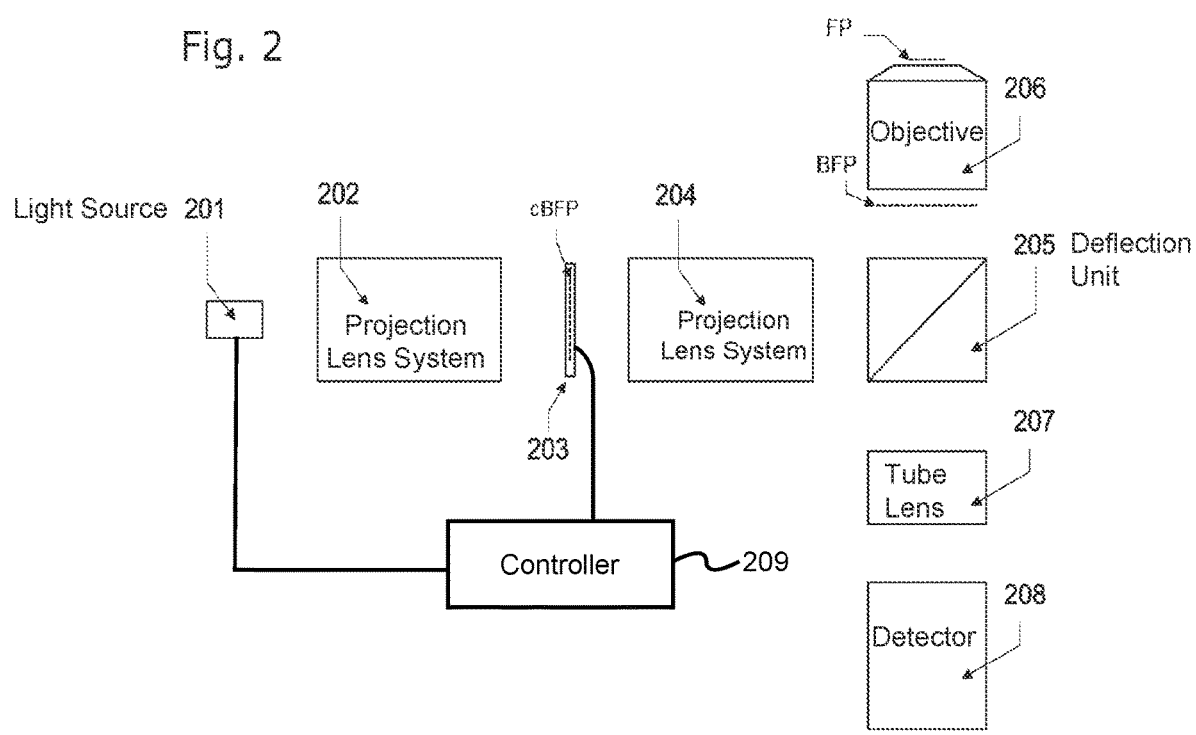
FIG. 2 illustrates a schematic diagram of the optical components of a TIRFM-capable microscope in a first embodiment.

FIG. 2 shows a schematic diagram of the optical system of a TIRFM-capable microscope in a first embodiment. An incoherent light source 201 generates excitation light, which is transmitted via a beam path to an objective 206, which, as shown in FIG. 1, has a front focal plane FP and a back focal plane BFP. The beam path comprises a first projection lens system 202 and a second projection lens system 204 as well as a deflection unit 205 which is configured, for example, as a dichroic mirror, by means of which the excitation light is directed from the light source 201 at least partially into the objective 206. In a plane cBFP conjugate to the back focal plane BFP of the objective 206 between the first projection lens system 202 and the second projection lens system 204, a first optical filter device 203 is arranged that spatially filters the excitation light and is configured to be able to provide various two-dimensional patterns for spatial filtering. The activation takes place by means of a controller 209 configured to control at least the light source 201 and first optical filter device 203. The first optical filter device 203 can be configured in this case as a transmission SLM, i.e., by means of a programmable LCD matrix, the matrix points of which can be switched between a transparent and a non-transparent state. The transmission SLM can be activated, for example, to generate an annular aperture, the inner diameter of which is the same as or greater than the critical radius for total reflection starting from the objective 206. Such a setting generates TIRF illumination.

The fluorescent light excited in a sample arranged in the focal plane FP of the objective 206 returns to the TIRFM-capable microscope through the objective 206. After passing through the deflection unit 205 and a tube lens 207, it impinges on a detector 208, which detects the fluorescent light and converts it into analyzable electrical signals. The deflection unit can be a beam splitter, but also a dichroic mirror whose transmission characteristics have an edge between the wavelength of the excitation light and the wavelength of the fluorescent light, such that the excitation light is deflected almost completely, while the fluorescent light is transmitted almost completely to the detector 208.

Figure 3:
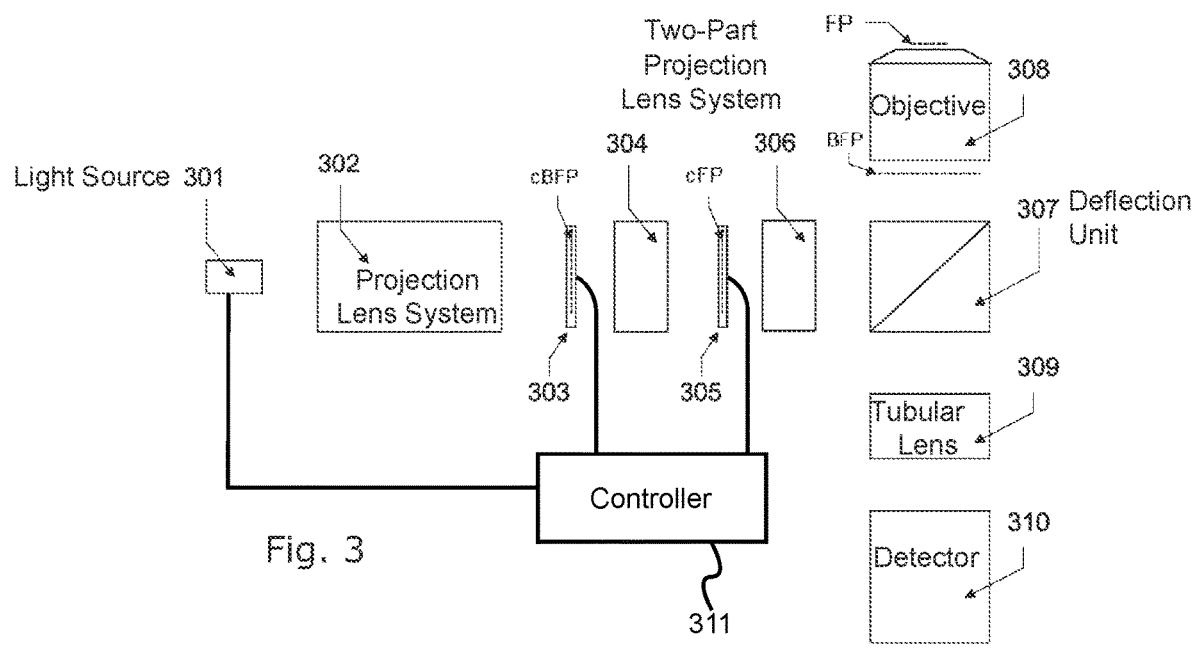
FIG. 3 illustrates a schematic diagram of a second embodiment with the optical components of a TIRF-SIM-capable microscope.

FIG. 3 shows a second exemplary embodiment of a TIRFM-capable microscope that represents a modification of the first exemplary embodiment. Incoherent excitation light is generated by a light source 301 and directed via a first projection lens system 302, a second projection lens system 304, 306 and a deflection unit 307 onto a focal plane FP of an objective 308, while fluorescent light, on the other hand, passes through the objective 308, the deflection unit 307 and a tubular lens 309 to impinge on a detector 310. In contrast to the first exemplary embodiment, however, the second projection lens system 304, 306 is divided in two, wherein a plane cFP conjugate to the focal plane FP of the objective 308 is present between the first part 304 and the second part 306 of the second projection lens system 304, 306. In this cFP, a second spatial filter device 305 is arranged which is also programmable.

Since the first spatial filter device 303 is arranged in the cBFP, an annular aperture and thus TIRF illumination can be generated there. The second spatial filter device in the cFP selects, which region of the focal plane FP is illuminated. In this manner, TIRF microscopy with structured illumination (TIRF-SIM) is established. In the second exemplary embodiment, the controller 311 is configured to control at least the light source 301 and first and second spatial filter devices 303, 305.

Figure 4:
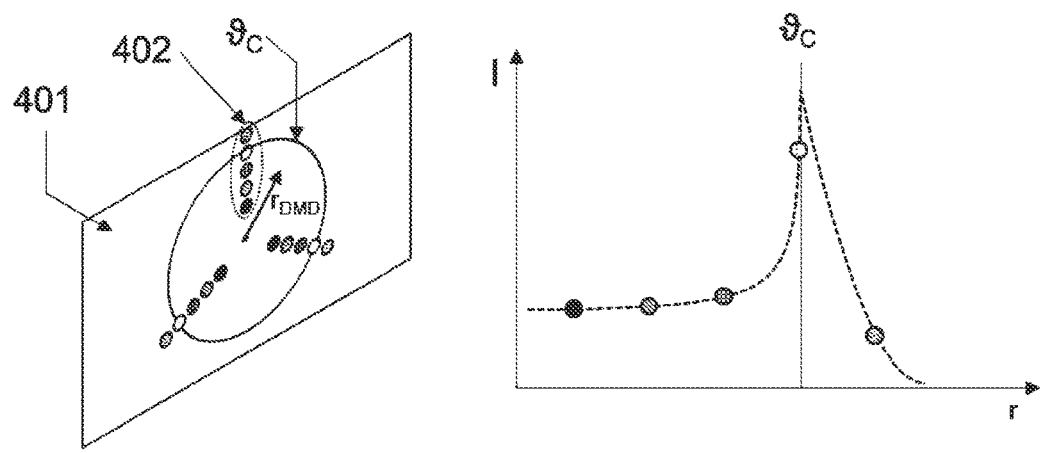
FIG. 4 illustrates a schematic diagram of the principle of the centering with a TIRFM-capable microscope.

An exemplary application for the operation of a TIRFM-capable microscope is shown schematically in FIG. 4. On the left side of FIG. 4, the surface of a digital mirror device (DMD) is shown as an example of a spatial filter device 401, which is arranged in a plane cBFP conjugate to the back focal plane BFP of an objective. Instead of a DMD, a transmission SLM can also be used. Overlaid over this plane is a circle that corresponds to the critical angle for the total reflection at the location of a sample in front of the objective and is centered on a center of the cBFP. Also shown are pixel clusters 402, which are arranged on three search paths, run at 1200 angles to each other from the edge of the digital mirror device to the center and are partially arranged outside, partially inside the critical radius. The pixel clusters 402 are marked with different textures which can also be found in the intensity curve shown in FIG. 4 on the right side. It can be recognized there that the intensity or luminosity I of the excited fluorescent light inside the critical radius r has an amount that changes only slightly. Upon approaching the critical radius or, respectively, the critical angle, the luminosity rises sharply, then drops sharply outside the critical radius and finally disappears.

The position of the center of the critical angle can thus be ascertained by measuring the maxima of the luminosity of the fluorescent light with regard to the various search paths and calculating the center point of the circle that runs through the pixel clusters with the maximum luminosity.

No structured illumination according to the second exemplary embodiment in FIG. 3 is necessary for this centering; instead, the structuring takes place in a plane conjugate to the back focal plane BFP of the objective. Each pixel cluster allows a non-collimated beam bundle to pass, which, when passing through the focal plane FP of the objective, corresponds to a collimated beam bundle that passes through the interface between the sample holder and the sample at a specific angle and in a specific direction (cf. FIG. 1) and is totally reflected or not depending on the angle of passage.

In FIG. 5, the optical components of a TIRFM-capable microscope in a third embodiment are schematically shown. In this exemplary embodiment, the microscope comprises two different incoherent light sources 501a, 501b that can generate different spectra and are each oriented via their own first projection lens systems 502a, 502b towards a first spatial filter device 504 configured as a digital mirror device arranged in a plane cBFP conjugate to the back focal plane BFP of the objective 507. The other components 505, 506, 507, 508, 509 correspond to the components 204, 205, 206, 207 and 208 from the first exemplary embodiment. Reference is made to the description of the first and the second exemplary embodiment for their functionality.

The switching process between the first light source 501*a* and the second light source 501*b* is described in the following. The micro mirror elements of the first spatial filter device 504 can be pivoted between a first position and a second position. When excitation light from the first light source 501*a* is to be used, the micro mirror elements required for generating TIRF illumination are pivoted into a first position in which excitation light from the first light source is reflected to the second projection lens system. The remaining micro mirror elements are pivoted into a second position, and the excitation light from the first light source 501*a* is transmitted to a radiation absorber 503*a* (beam dump). This facilitates a very high contrast. The second light source 501*b* is also assigned a radiation absorber 503*b*. The light sources 501*a*, 501*b* and the radiation absorbers 503*a*, 503*b* are arranged symmetrically to the further beam path such that to switch from one light source to the other, the pivot position of all the micro mirror elements must simply be inverted and the first light source 501*a* must be switched off and the second light source 501*b* must be switched on.

For epi-illumination, both light sources 501*a*, 501*b* can also be left on, and for the switching all the micro mirror elements of the first spatial filter device 504 are brought into a first or a second pivot position.

In the third embodiment, the controller 510 is configured to control at least the light sources 501*a*, 501*b* and the micro mirror elements of the first spatial filter device 504.

FIG. 6 schematically shows the optical components of a TIRFM-capable microscope in a fourth embodiment. The light source 601, the first projection lens system 602, the two-part second projection lens system 604, 606, the deflection unit 607, the objective 608, the tubular lens 609 and the detector 610 as well as a second spatial filter device 605 in the plane cFP conjugate to the focal plane FP of the objective 608 between the two parts 604, 606 of the second projection lens system correspond to the arrangement and the components of the second embodiment in FIG. 3. Instead of a programmable transmission SLM, in the fourth embodiment an aperture changing device 603 is provided, for example in the form of an aperture ring, which provides a plurality of different aperture shapes and sizes. These can contain annular apertures and circular apertures of various sizes such that both epi-illumination and TIRF illumination can be set for different values of critical angles.

Figure 7:
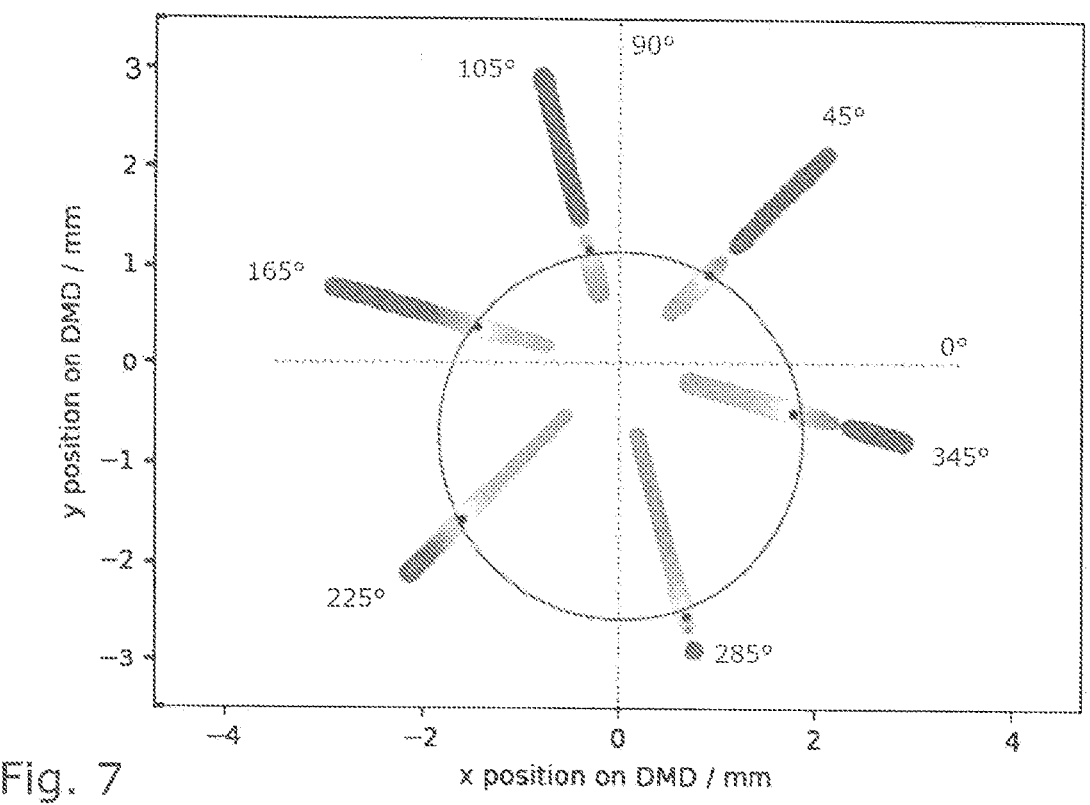
FIG. 7 illustrates an example of a luminescence measurement using search paths.
Figure 8:
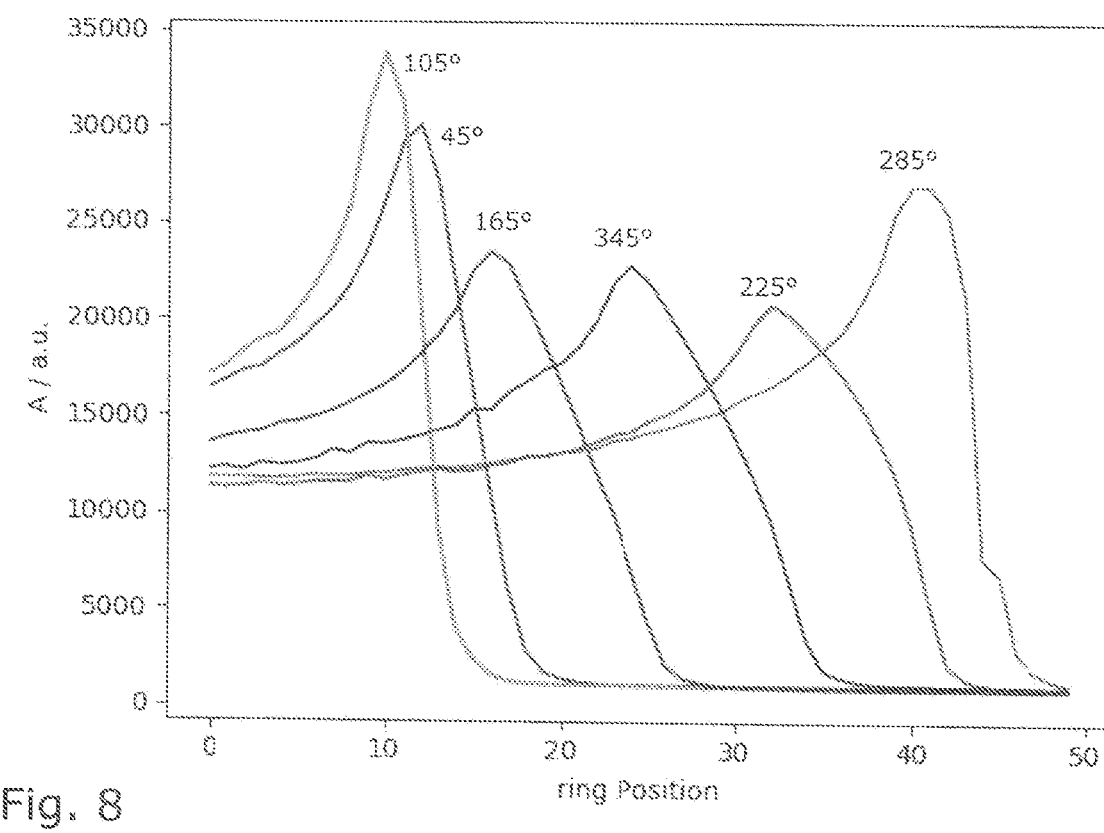
FIG. 8 illustrates luminescence curves corresponding to the search paths from FIG. 7.

In the third embodiment, the controller 611 is configured to control at least the light source 601, aperture changing device 603 and the second spatial filter device 605. FIGS. 7 and 8 show examples of a centering according to a method. This requires an arrangement according to the first, second or third embodiment, i.e., a programmable spatial filter device at the location of a cBFP plane. In FIG. 7, the x-y position on the surface of a spatial filter device, in this case a reflection SLM or DMD, is shown. Six search paths, each at a distance of 600 from each other, are shown, each of which run from the edge in a straight line toward the center of the DMD at x=0 mm and y=0 mm. Along each of these search paths, a small circular area is cleared to relay the excitation light and the excitation light is blocked in the rest of the surface. The small cleared area is swept along the six search paths and the luminosity of the returning fluorescent light is measured. The measured luminosity is plotted as a brightness, wherein black means a disappearing signal and white a strong signal. The corresponding trajectories along the individual search paths in the radial direction from the center of the DMD are plotted against the distance from the center in FIG. 8.

It turns out that a luminosity maximum is found on each of the search paths, but the distance of the respective location with a luminosity maximum from the center depends on the angle of the search path. The maxima lie on a circle describing the critical radius and the center of the back focal plane. These values can be used for centering and for ascertaining the inner radius of a suitable annular pattern for TIRF illumination. A second search run can be performed such that the search paths run towards the center of the circle found in this manner. This has the advantage that the maxima are better defined than in FIG. 8 and are each similarly as sharp as the maximum of the curve denoted with 105° in FIG. 8. This achieves an optimal resolution and centering.

Figure 9A:
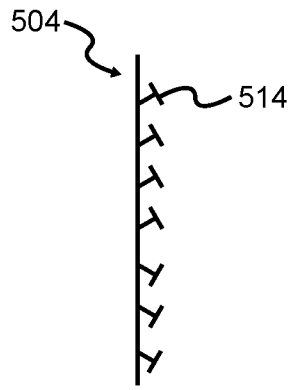
FIGS. 9A and 9B illustrate two states of a micro-mirror device having pivotable micro-mirrors.
Figure 9B:
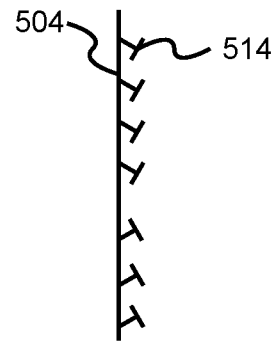

Turning next to FIGS. 9A and 9B, an exemplary embodiment of the micro mirror device 504 of FIG. 5 is shown having pivotable micro mirrors 514. Such micro mirror device 504 can have a matrix of pivotable micro mirrors, having several hundreds or thousands of rows and columns of micro mirrors. In FIG. 9A, a boundary is formed between four micro mirrors pivoted upward and three micro mirrors pivoted downward, whose direction is reversed in FIG. 9B, inverting the pattern. In use in the embodiment of FIG. 5, the controller 510 switches between the two light sources 501*a* and 501*b* on different parts of the switch-active surface of the micro mirror device 504.

Figure 10:
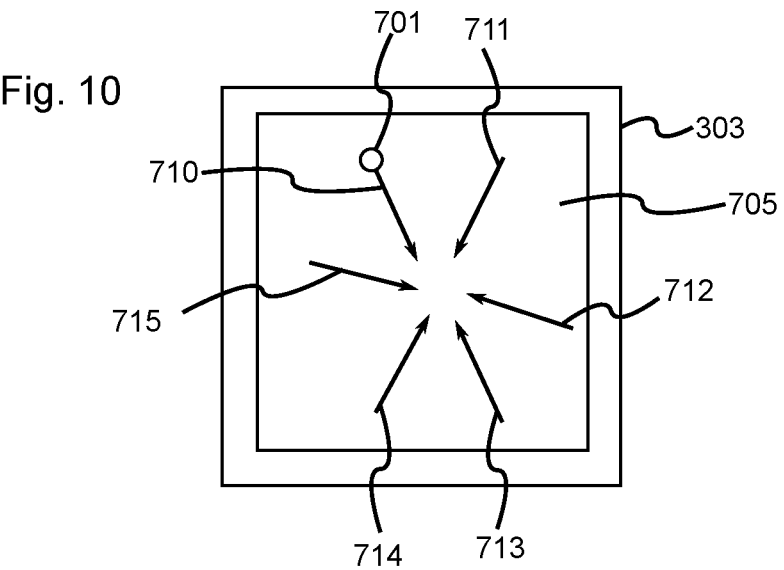
FIGS. 10 and 11 illustrate patterns of transparent and opaque regions of spatial filter devices.
Figure 11:
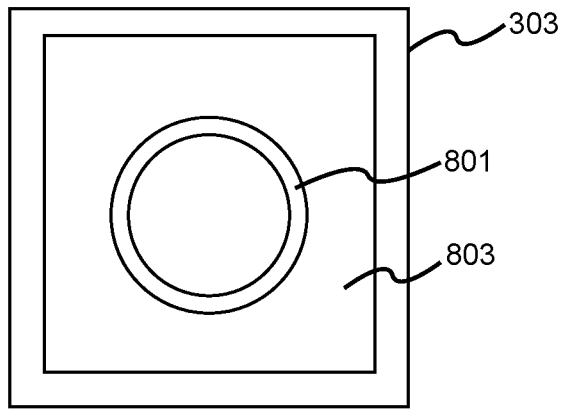

Turning to FIGS. 10 and 11, the same illustrate front view patterns on the first spatial filter device 303, 504, which may be a switchable LCD matrix 705 controlled by the controller 311, 510, respectively. In FIG. 10, the controller switches the region 701 into a transparent mode, whereas the rest of the switchable LCD matrix is switched to be opaque, meaning that only a single beam of light will pass the switchable LCD matrix 705. The transparent region 701 is then moved along trajectories or search paths 710, 711, 712, 713, 714, 715. By moving the spot 701 along such search paths towards a center of the switchable LCD matrix 705, the maxima of the luminescence responses can be ascertained, as shown in FIG. 7. As a result, the center of the circle as the center of the back focal plane can be found. Once the center of the back focal plane has been found as well as the optimum of the radius for luminescence lighting, the switchable LCD matrix 705 is controlled to become transparent in a ring shaped aperture 801 as shown in FIG. 11, which corresponds to the circle shown in FIG. 7, whereas the remainder 803 of the switchable LCD matrix 705 is controlled to be opaque.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE NUMBERS

101 Objective
102 Beam bundle
103 Collimated beam bundle
104 Beam bundle
105 Collimated beam bundle
201 Light source
202 First projection lens system
203 First spatial filter device
204 Second projection lens system 205 Deflection unit
206 Objective
207 Tubular lens
208 Detector
209 Controller
301 Light source
302 First projection lens system
303 First spatial filter device
304 Front part of a second projection lens system
305 Second spatial filter device
306 Back part of a second projection lens system
307 Deflection unit
308 Objective
309 Tubular lens
310 Detector
311 Controller
401 First spatial filter device
402 Pixel cluster on search path
501a First light source
501b Second light source
502a First projection lens system
502b Third projection lens system
503a First beam absorber
503b Second beam absorber
504 First spatial filter device
505 Second projection lens system
506 Deflection unit
507 Objective
508 Tubular lens
509 Detector
510 Controller
514 Pivotable Micro-Mirrors
601 Light source
602 First projection lens system
603 Aperture changing device
604 Front part of a second projection lens system
605 Second spatial filter device
606 Back part of a second projection lens system
607 Deflection unit
608 Objective
609 Tubular lens
610 Detector
611 Controller
701 Region of Spatial Filter Device
705 LCD Matrix
710-715 Search Paths
801 Transparent Portion of Spatial Filter Device
803 Opaque Portion of Spatial Filter Device
BFP Back focal plane
FP Focal plane
cBFP Plane conjugate to the back focal plane
cFP Plane conjugate to the focal plane
r Radius
I Luminosity

What is claimed is:

1. A TIRFM-capable microscope, comprising:
a first light source configured to generate and emit incoherent excitation light onto a first optical path;
the first optical path comprises in order from the first light source, a first projection lens system, a first spatial filter device, a second projection lens system and an objective; and
a first controller;
wherein the first projection lens system is configured to project the excitation light onto the first spatial filter device and the first spatial filter device is configured to spatially filter the excitation light with two-dimensional patterns,
the first spatial filter device lies in a first configuration in a plane (cBFP) conjugate to a back focal plane (BFP) of the objective,
the objective comprises an objective lens which is configured to direct the excitation light onto a sample and receive fluorescent light from the sample, wherein, for a numerical aperture $NA_{Obj}$ of the objective and a refractive index $n_{spec}$ of the sample $NA_{Obj} > n_{spec}$, and
the first controller is configured to activate the first spatial filter device to select or generate various two-dimensional patterns and select or adjust the position, shape, and/or size of the two-dimensional pattern such that TIRF illumination of the sample is generated;
wherein the first controller is further configured to activate the first spatial filter device to provide an annular pattern and a circular pattern as two-dimensional patterns in order to switch between TIRF illumination and non-TIRF illumination.

2. The TIRFM-capable microscope according to claim 1, wherein an outer radius of the annular pattern is smaller than or equal to a maximum of an extension of a back focal plane (BFP) of the objective and an inner radius of the annular pattern is greater than or equal to a critical radius of the back focal plane which corresponds to a critical angle for a total internal reflection in a focal plane (FP) of the objective.

3. The TIRFM-capable microscope according to claim 1, further comprising a second spatial filter device arranged in the first optical path in a plane (cFP) conjugate to the focal plane (FP) of the objective, the second spatial filter device being configured to spatially filter the excitation light with a plurality of different two-dimensional patterns, wherein one of the first controller or a second controller is configured to activate the second spatial filter device to select or generate a series of two-dimensional patterns.

4. The TIRFM-capable microscope according to claim 1, wherein the first spatial filter device comprises an aperture changing device with multiple circular and annular apertures.

5. The TIRFM-capable microscope according to claim 4, wherein the aperture changing device comprises a rotatable aperture ring.

6. The TIRFM-capable microscope according to claim 4, wherein the programmable spatial light modulator comprises a spatial transmission light modulator.

7. The TIRFM-capable microscope according to claim 1, wherein the first spatial filter device comprises a programmable spatial light modulator.

8. The TIRFM-capable microscope according to claim 1, wherein the first spatial filter device comprises a spatial reflection light modulator.

9. The TIRFM-capable microscope according to claim 1, wherein the second spatial filter device comprises one of a programmable spatial transmission or a reflection light modulator.

10. The TIRFM-capable microscope according to claim 1, wherein one or more of the first projection lens system, the second projection lens system and the first spatial filter device are at least partially arranged movably along the first optical path such that the first spatial filter device can be brought from the first configuration into a second configuration in which the first spatial filter device is arranged in a plane conjugate to the focal plane (FP) of the objective.

11. The TIRFM-capable microscope according to claim 1, further comprising:
a third projection lens system configured to conjugate the first spatial filter device to the focal plane (FP) of the objective; and
a switching optical unit arranged between the first spatial filter device and the objective, the switching optical unit being configured to switch the optical path between the second projection lens system and the third projection lens system.

12. The TIRFM-capable microscope according to claim 1, further comprising:
a second light source configured to generate and emit incoherent excitation light;
wherein the first light source and the second light source are each oriented towards the first spatial filter device, wherein the first spatial filter device comprises a digital mirror device having pivotable micro mirror elements and
in a first pivot position of the micro mirror elements, direct excitation light from the first light source and, in a second pivot position of the micro mirror elements, direct excitation light from the second light source into the first optical path.

13. The TIRFM-capable microscope according to claim 12, wherein at least one of the first light source and the second light source comprises one or more LEDs.

14. The TIRFM-capable microscope according to claim 12, wherein the first light source and the second light source comprise a light bulb and a light conductor.

15. The TIRFM-capable microscope according to claim 12, wherein the first light source and the second light source comprise a laser light source and a dynamic diffuser.

16. A method for operating a TIRFM-capable microscope, the TIRFM-capable microscope comprising
a first light source configured to generate and emit incoherent excitation light onto a first optical path;
the first optical path comprises in order from the first light source, a first projection lens system, a first spatial filter device, a second projection lens system and an objective; and
a first controller;
wherein the first projection lens system is configured to project the excitation light onto the first spatial filter device and the first spatial filter device is configured to spatially filter the excitation light with two-dimensional patterns,
the first spatial filter device lies in a first configuration in a plane (cBFP) conjugate to a back focal plane (BFP) of the objective,
the objective comprises an objective lens which is configured to direct the excitation light onto a sample and receive fluorescent light from the sample, wherein, for a numerical aperture NAObj of the objective and a refractive index nspec of the sample NAObj>nspec, and
the first controller is configured to activate the first spatial filter device to select or generate various two-dimensional patterns and select or adjust the position, shape, and/or size of the two-dimensional pattern such that TIRF illumination of the sample is generated,
wherein the first controller is further configured to activate the first spatial filter device to provide an annular pattern and a circular pattern as two-dimensional patterns in order to switch between TIRF illumination and non-TIRF illumination,
the method comprising using a search pattern sequence of two-dimensional patterns on the first spatial filter device to find a center of the back focal plane (BFP) of the objective, each of which has a single small pixel cluster for conveying excitation light on the first optical path, which is moved within the search pattern sequence over search paths, wherein locations are noted at which the luminescence of the fluorescent light returning from the objective have maxima, and a center of a circle on which lie the multiple maxima of the luminescence that have been found is ascertained as the center of the back focal plane of the objective.

17. The method according to claim 16, wherein the search pattern is a straight search pattern.

18. The method according to claim 16, wherein multiple search paths run at various angles from an edge to a center of the first spatial filter device.

19. A method for operating a TIRFM-capable microscope, the TIRFM-capable microscope comprising:
a first light source configured to generate and emit incoherent excitation light onto a first optical path;
the first optical path comprises in order from the first light source, a first projection lens system, a first spatial filter device, a second projection lens system and an objective; and
a first controller;
wherein the first projection lens system is configured to project the excitation light onto the first spatial filter device and the first spatial filter device is configured to spatially filter the excitation light with two-dimensional patterns,
the first spatial filter device lies in a first configuration in a plane (cBFP) conjugate to a back focal plane (BFP) of the objective,
the objective comprises an objective lens which is configured to direct the excitation light onto a sample and receive fluorescent light from the sample, wherein, for a numerical aperture $NA_{Obj}$ of the objective and a refractive index $n_{spec}$ of the sample $NA_{Obj} > n_{spec}$,
the first controller is configured to activate the first spatial filter device to select or generate various two-dimensional patterns and select or adjust the position, shape, and/or size of the two-dimensional pattern such that TIRF illumination of the sample is generated; and
one or more of a sequence of search patterns with increasing fineness is run.

* * * * *